United States Patent Office 3,204,666
Patented Sept. 7, 1965

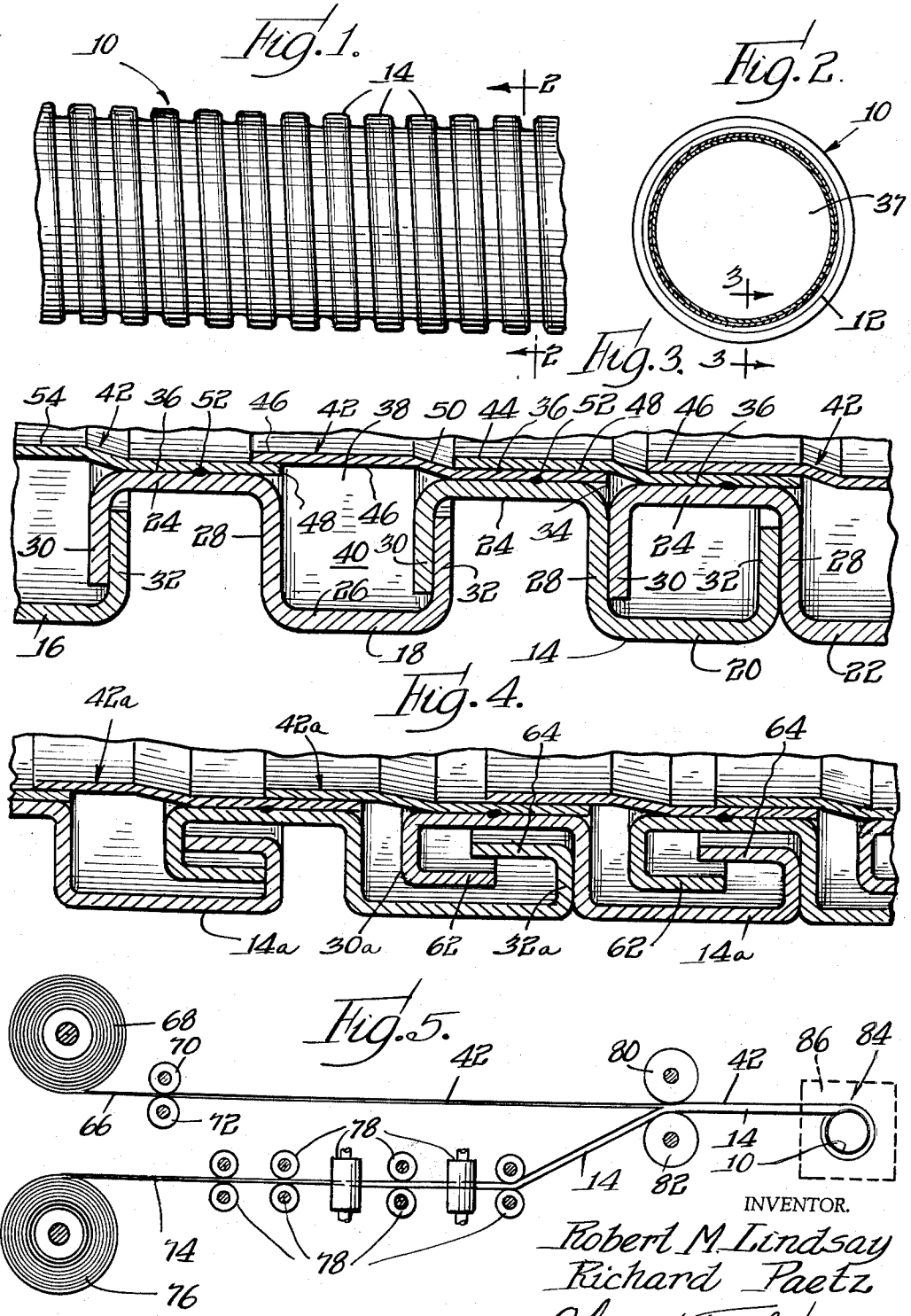

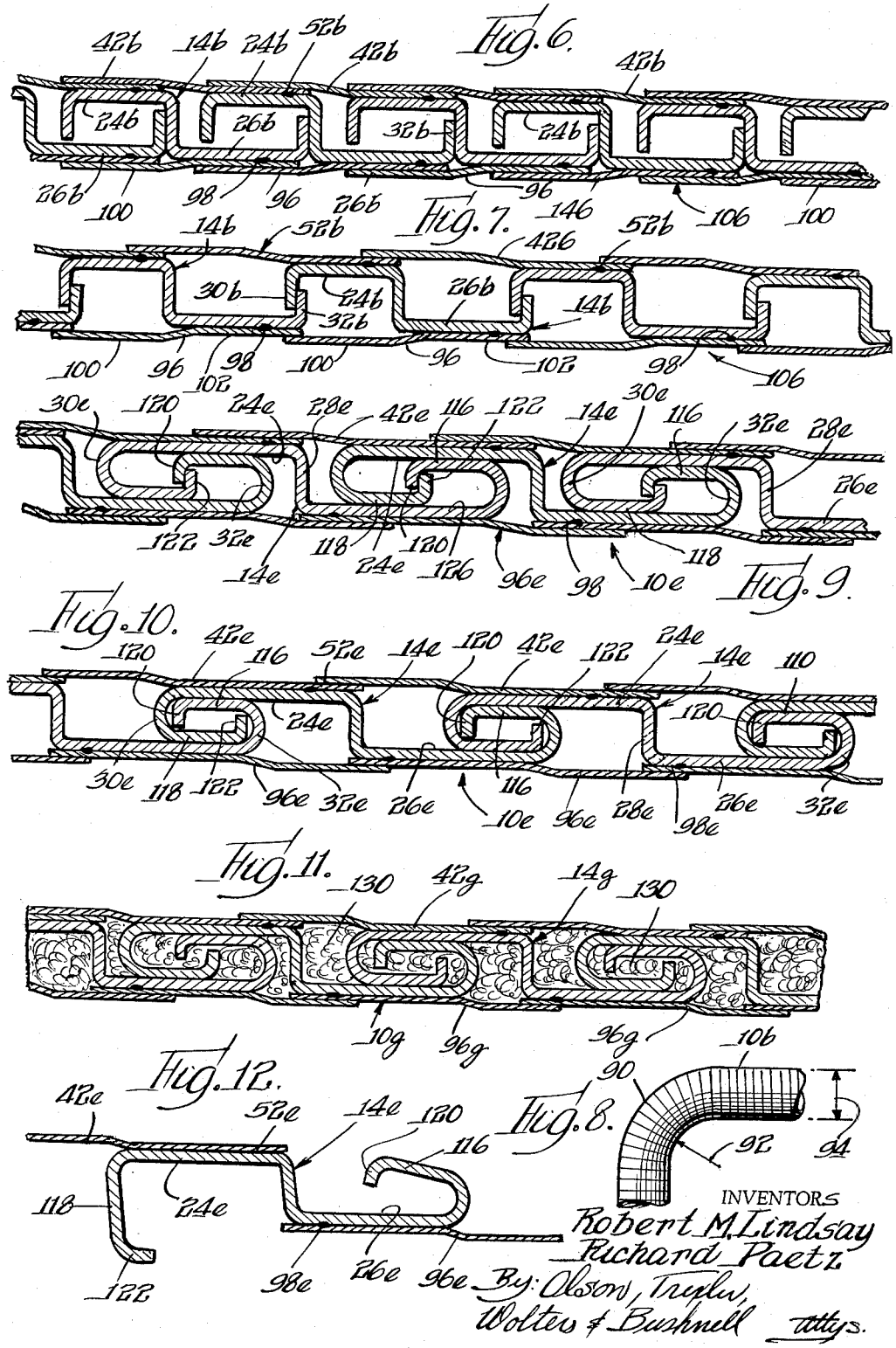

3,204,666
HELICALLY WOUND FLEXIBLE HOSE
Robert M. Lindsay, Oak Park, and Richard Paetz, Sterling, Ill., assignors to Calumet & Hecla, Inc., Chicago, Ill., a corporation of Michigan
Filed Dec. 17, 1962, Ser. No. 245,264
9 Claims. (Cl. 138—135)

The present application is a continuation-in-part of copending application Serial No. 814,317, filed May 19, 1959, and now abandoned.

The present invention relates to flexible metal hose or tubing formed basically by a profile or body strip shaped and helically wound in a manner which provides for movement of adjacent turns of the strip in relation to each other to enable the hose to bend and to expand and contract lengthwise.

One object of the invention is to provide a helically wound hose of the above character having an improved construction which defines within the hose a substantially smooth, continuous bore, while at the same time affording for the hose an inherent capability of maintaining its structural integrity and functional usefulness under adverse environmental conditions under which prior hose has been subject to failure.

Another object is to provide a helically wound flexible hose of the above character having an improved construction which assures retention of adjacent turns of the profile strip in assembled relation to each other when subjected to vibration, giration, rapid and extreme flexing, and other environmental conditions which have caused separation of adjacent turns of conventional helically wound hose, while at the same time providing in the hose a great flexibility and the capability of bending through bends of short radius without adverse effects.

Another object is to provide a helically wound flexible hose or tubing having an improved construction by virtue of which structure integral with the helical profile or body strip of the hose is effective of itself, without the aid of other structure, to hold adjacent turns of the profile or body strip in assembled relation to each other under adverse environmental conditions, while at the same time affording other worthwhile advantages.

Another object is to provide an improved helically wound hose of the above character in which both great flexibility and a virtual immunity to disassembly under adverse environmental conditions are provided by an improved and extremely practical hose structure all of which is integral with the helical profile or body strip and which serves to effectively shield interstices within the hose wall from the entry thereinto of foreign bodies.

Another object is to provide a helically wound hose formed of a profile or body strip of improved shape which provides a high order of flexibility and assurance against disassembly of the hose under adverse environmental conditions, while at the same time sharply minimizing the weight of the hose.

Another object is to provide improved helically wound hose of the character recited in the preceding objects which is inherently adapted for efficient and economical manufacture on a mass production basis.

Other objects and advantages will become apparent from the following description of the invention taken with reference to the drawings, in which:

FIG. 1 is a side elevational view of the hose forming the first illustrated embodiment of the invention as disclosed in said copending application Serial No. 814,317;

FIG. 2 is a cross sectional view of the hose taken along the line 2—2 of FIG. 1;

FIG. 3 is a fragmentary longitudinal sectional view taken along the line 3—3 in FIG. 2;

FIG. 4 is a view similar to FIG. 3 but showing a modified form of profile strip used in the hose structure;

FIG. 5 is a schematic illustration of a method and apparatus for manufacturing the hose of FIGS. 1 to 4;

FIG. 6 is a longitudinal sectional view of the wall of a hose forming another embodiment of the invention, the hose being illustrated in its shortened condition;

FIG. 7 is a view similar to FIG. 6 but showing the hose extended;

FIG. 8 is a side view showing on a reduced scale the hose of FIGS. 6 and 7 turned in a sharp bend which illustrates the flexibility of the hose;

FIG. 9 is a longitudinal sectional view of a modified hose structure incorporating another feature of the invention, the hose being illustrated in its shortened condition;

FIG. 10 is a view similar to FIG. 9 but showing the hose extended;

FIG. 11 is a view similar to FIG. 9 but showing the hose partially extended and illustrating compressible insulating material positioned within the hose wall;

FIG. 12 is a transverse sectional view showing a profile strip with attached liner and shield strips prior to winding the profile strip to form the hose of FIGS. 9 and 10;

Figure 13:
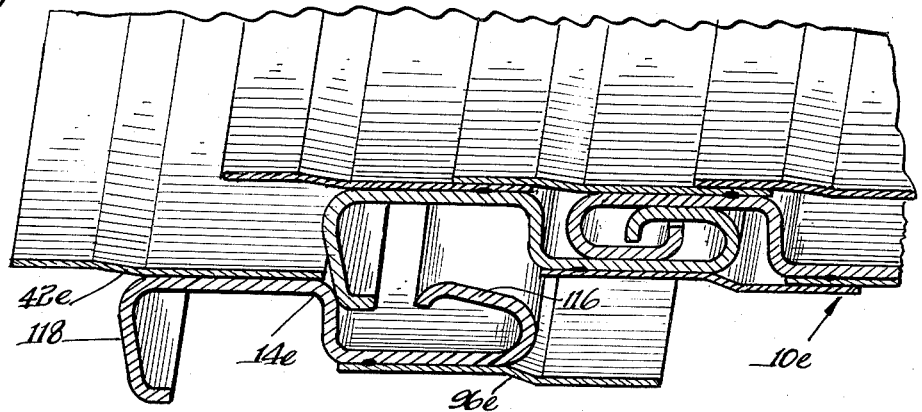
FIG. 13 is a longitudinal sectional view of a hose wall illustrating the winding together of the strip structure of FIG. 12 to form the hose of FIGS. 9 and 10.

Referring to the drawings in greater detail, the flexible metal hose 10 illustrated in FIGS. 1 to 3 has a cylindrical wall 12 formed by a helically wound profile strip 14 having adjacent turns mutually locked together in a manner which provides for movement of adjacent turns of the profile strip relative to each other to allow the hose to bend and to elongate and contract in length. Only four turns 16, 18, 20 and 22 of the profile strip 14 are shown in FIG. 3.

The strip 14 shown in FIG. 3 provides what is known in this art as a "square" lock between adjacent turns of the strip. As shown, the strip 14 is shaped in transverse section to define an outwardly open channel 24 and an inwardly open channel 26 having a common leg 28. The inwardly open channel 26 receives the outside leg 30 of the channel 24 and the channel 24 receives the outside leg 32 of the channel 26 as shown.

FIGURE 3 shows the three profile strip turns 16, 18 and 20 axially extended or moved away from each other to the fullest possible extent and shows the adjacent profile turns 20, 22 telescoped together to the maximum possible extent. It will be noted that even when the two adjacent turns 20 and 22 are in their fully telescoped positions relative to each other, a substantial gap or discontinuity 34 exists just between the cylindrical surfaces 36 on the adjacent channels 24 of these turns which face radially inward toward the center of the bore 37 in the hose. The space between the surfaces 36 of the adjacent channels 24 is greatly expanded to a very extensive gap or discontinuity 38 upon axial extension of the corresponding turns of the hose. This discontinuity 38 opens into a rather large interstice 40 between opposed portions of adjoining turns of the profile strip.

The inner surface of the flexible hose wall 12 is covered by a relatively thin lining strip 42 fixed to the profile strip 14, as will be presently described, and having a shape and dimensions which provide upon formation of the hose 10, a hose bore defining surface 44 which is axially continuous and relatively smooth.

The lining strip 42 is shaped as shown in transverse section in FIG. 3 to have two lengthwise side or panel portions 46, 48 which are individually straight as viewed in transverse section and which have a combined width forming the major portion of the width of the lining strip. The two longitudinal panel portions 46, 48 of the strip 42 are parallel and offset relative to each other to a degree equal to the thickness of the lining strip. The side portions 46, 48 are connected by an intervening longitudinal portion 50 of the strip.

The lining strip 42 has a width which somewhat exceeds the maximum axial lead of the profile strip 14 when the hose 10 is axially extended to the maximum degree permitted by the mutually locked turns of the profile strip 14. It will be understood that the lead of the profile strip 14 is the distance it progresses axially along the hose 10 in making one complete turn.

As shown in FIG. 3, the straight longitudinal side portion 48 of the lining strip 42 is placed flat against the radially inward surface 36 of the channel 24 of the profile strip 14 and fixedly united with the profile strip by a continuous seam 52 of resistance welding in which the current and pressure are restricted to portions of the metal surfaces in contact. Uniting of the lining strip 42 and the profile strip 14 by welding as illustrated and described makes the lining strip and profile strip integral with each other. It will be understood that brazing or other suitable joining means may be substituted for the welding 52.

The opposite longitudinal side portion 46 of the lining strip 42, which is offset radially inward from the side portion 48, projects beyond the adjacent marginal edge of the profile strip 14, as shown. The projecting side portion 46 slidably overlaps the longitudinal side portion 48 of the adjacent turn of the lining strip fixed to the adjacent turn of the profile strip.

As previously intimated the profile strip 42 can have a number of forms. One alternative form known in the art as an "interlocking" strip is shown in FIG. 4, in which component parts similar to those previously described are designated by the same reference numerals with the addition of the suffix "a." The interlocking profile strip 14a shown in FIG. 4 differs from the profile strip 14 previously described in relation to FIG. 3 principally by the addition of two axial flanges 62, 64 integral with the projecting ends of the channel legs 30a and 32a and extending axially into overlapping relation with each other as shown.

The method and apparatus provided for manufacturing the improved hose is illustrated in FIG. 5. The lining strip 42 and the profile strip 14 are fixed together and then helically wound together to produce the hose 10. Thus, as illustrated in FIG. 5, a strip of sheet metal stock 66 for the lining strip is supplied from a roll 68 and fed between an opposed pair of forming rollers 70, 72 which are shaped to form the strip of stock 66 to have the shape in transverse section desired in the lining strip 42. A second strip of stock material 74 for forming the profile strip 14 is supplied from a roll 76 to a series of profile rollers 78 which shape the strip of stock 74 in a manner well understood in this art to provide a profile strip 14 having the particular shape in transverse section desired for forming the wall 12 of the hose to be constructed.

The formed lining strip 42 and the shaped profile strip 14 are transversely aligned with each other so that the lining strip side portion 48 overlaps the surface 36 of the profile strip in the manner previously described in relation to FIG. 3, and the two strips are fed simultaneously between two opposed welding electrodes 80, 82 which fix the lining strip and profile strip together by a seam of resistance welding 52, illustrated in FIG. 3. The lining strip 42 and the profile strip 14 thus welded together move on from the welding electrodes to a hose winding station 84 where hose winding means 86 of a conventional construction, indicated diagrammatically in phantom in FIG. 5, is used to helically wind the profile strip 14 to form the hose 10, this winding of the profile strip at the same time serving to effect a helical winding of the lining strip 42 into the form described in relation to FIG. 3. In this manner, the lined hose 10 is rapidly and economically manufactured on a mass production basis.

Component elements of the hose 10b, forming the modified embodiment of the invention illustrated in FIGS. 6 and 7, which are similar to components of the hose 10 illustrated in FIGS. 1 to 3 are identified with the same reference numbers with the addition of the suffix "b." Like the hose 10 previously described, the hose 10b comprises a profile strip 14b shaped in transverse section and helically wound to form a flexible hose wall of a "square locked" construction.

Helically wound, flexible metal hose of "square locked" construction characteristically is very flexible and susceptible of being bent without damage through very sharp turns. This marked capability of square locked, flexible metal hose formed of a helically wound profile strip is related to an inherent capability of such hose to expand and contract along its length through a wide range of movement which approaches the minimum length of the hose when it is fully contracted lengthwise.

The wide range through which square locked hose can be expanded and contracted lengthwise can be visualized with reference to FIG. 6, which illustrates the hose in its fully contracted condition, and FIG. 7 which illustrates the hose in its fully extended position. Thus, it will be evident, upon comparison of FIGS. 6 and 7, that each turn of the profile strip 14b in the hose wall has a range of movement along the axis of the hose in relation to each adjacent turn of the profile strip that is equal to the lateral width of the outwardly open channel 24b diminished only by the thickness of the profile strip which forms the leg 32b that is received in the channel 24b.

The marked bendability which is characteristic of square locked hose, including the hose 10b, is illustrated in FIG. 8, which shows that hose of this construction can be bent in a curve 90 such that the minimum bend radius 92 of the hose is reduced to a value approaching the diameter 94 of the hose.

The marked bendability and extensibility characteristic of square locked helically wound hose provides distinct advantages in many environments in which a less flexible and a less extensible hose would be less desirable. However, conventional square locked hose has been vulnerable to disassembly of adjacent turns of the profile strip, with consequent failure of the hose when the hose has been subject to vibration, quick flexing and other dynamic disturbances to which hose is sometimes exposed in a non-static environment.

The hose 10b, however, is rendered capable of maintaining its structural integrity under such adverse environmental conditions by a construction which retains for the hose 10b the high order of bendability and extensibility that are characteristic of conventional square locked hose that has been susceptible of failure under conditions in which the hose 10b is very serviceable.

For this purpose, a shield strip 96, FIGS. 6 and 7, is fixed or united to the profile strip 14b to become an integral part of the profile strip in a manner such that the shield strip has, with respect to the hose wall formed by the interlocking channels of the profile strip, an external position in which the shield strip extends laterally between the inwardly open channels 26b of adjacent turns of the profile strip to preclude radial displacement of adjacent turns of the profile strip such as would allow disengagement of the interfitting, inwardly and outwardly open channels of adjacent turns of the profile strip.

As illustrated in FIGS. 6 and 7, the shield strip 96 extends lengthwise along the inwardly open channel 26b of the profile strip 14b and is integrally attached to the outer surface of the profile strip channel 26b by a continuous seam weld 98. The shield strip 96 projects laterally from the profile strip channel 26b with which the shield strip is integrally united by the weld 98, into confronting relation to the outwardly open channel 24b of the profile strip, so that in the fully assembled hose the inwardly open channel 26b of each turn of the profile strip interfits between the outwardly open channel 24b and the laterally projecting portion of the profile strip on the adjacent turn of the profile strip.

In the construction illustrated in FIGS. 6 and 7, the shield strip 96 comprises a cantilevering channel portion 100 which is generally straight as viewed in transverse section, and which is offset radially outward by the thickness of the shield strip from a supporting channel portion 102 of the shield strip which lies flat against the inwardly open channel 26b, and which is united integrally with the profile strip by the weld 98.

In the formed hose, the cantilevering channel portion 100 of the shield strip 96 slidably engages structure on the inwardly open channel 26b of an adjacent turn of the profile strip and, as shown, slidably overlaps the supporting channel portion 102 of the shield strip on the adjacent turn of the profile strip.

It should be appreciated that vibratory forces to which the hose may be subjected in some environments can tend to cause convolutions of the profile strip to girate, and can tend to cause individual turns of the profile strip to contract in diameter in relation to adjacent turns of the profile strip. The effect of this is a tendency to cause the inwardly turned leg 32b on one or more turns of the profile strip to be displaced radially outward in relation to the outwardly turned leg 30b on an adjacent turn of the profile strip, so that two or more adjacent turns of the profile strip may be unhooked or disconnected from each other.

However, such disassembly of adjacent turns of the profile strip 14b cannot occur in the hose 10b, by virtue of the action of the shield strip 96 which prevents the outwardly open channel 24b of each turn of the profile strip from becoming disengaged from the inwardly open channel 26b of an adjacent turn of the profile strip through the coaction of the shield strip with the inwardly open channel of the adjacent turn of the profile strip that precludes outward displacement of the corresponding portion of the channel leg 32b relative to the adjacent portion of the channel leg 30b to a degree sufficient to permit disengagement of adjacent turns of the profile strip.

Yet, the shield strip 96 does not interfere with or restrict lateral movement of each inwardly turned channel leg 32b within the channel 24b in which the leg 32b is received.

Also, the freedom of the outwardly turned channel leg 30b to move laterally within the inwardly open channel 26b receiving the leg 30b is unrestricted by the shield strip 96. Consequently, the hose 10b, which is protected against disassembly under adverse environmental conditions by the shield strip 96 integral with the profile strip 14b, has the same highly advantageous extensibility and bendability which are characteristic of square locked helically wound hose.

As shown in FIGS. 6 and 7, the internal bore of the hose 10b is smoothed by a helical lining strip 42b integrally secured to the profile strip 14b by a seam weld 52b.

Figure 14:
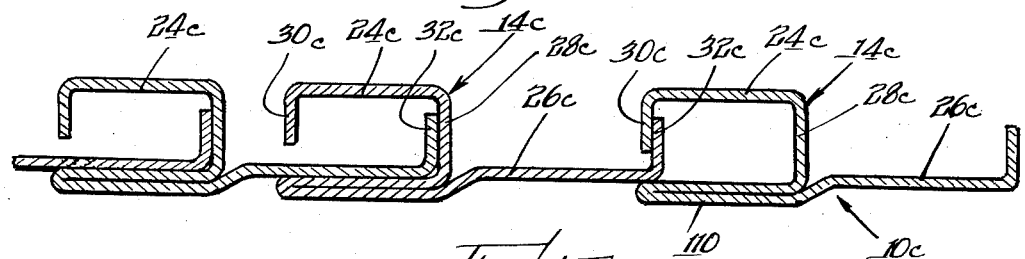
FIG. 14 is a longitudinal sectional view of the wall of another form of hose constructed in accordance with the invention.

The construction of the hose 10c shown in FIG. 14 illustrates the manner in which the shield strip can be formed not only as an integral part of the profile strip 14c, but also from the same piece of material used to form the profile strip. Component elements of the modified hose 10c illustrated in FIG. 14 which are similar to components of the hose 10b illustrated in FIGS. 6 and 7 are identified with the same reference numbers, but with the use of the suffix "c".

As illustrated in FIG. 14, the profile strip 14c is shaped, at the juncture of the inwardly open channel 26c, with the common leg or central drop 28c between the inwardly and outwardly open channels 26c, 24c, to form a fold 110 generally flat in transverse section which cantilevers from the inwardly open channel 26c into opposed confronting relation to the outwardly open channel 24c. As shown, the fold 110 is dimensioned to extend laterally at least across the full lateral width of the outwardly open channel 24c to constitute a shield strip integral with the profile strip which serves the same function as the shield strip 96 integral with the profile strip 14b, previously described in relation to the hose 10b shown in FIGS. 6 and 7.

Thus, the shield strip formed by the fold 110, and identified for convenience by the same number 110 applied to the fold, serves on each turn of the profile strip 14c in the hose to closely overlap the inwardly open channel 26c on the adjacent turn of the profile strip, which extends into the space between the outwardly open channel 24c and the shield strip 110 wherein the inwardly turned leg 32c on the inwardly open channel 26c is positively entrapped by the coaction of the shield strip 110 and the outwardly turned leg 30c on the profile strip. In regard to the described entrapment of the inwardly turned leg 32c of the profile strip, it should be noted that the shield strip or fold 110 and the outwardly turned leg 30c of the profile strip have a radial spacing from each other which is materially less than the radial dimension of the inwardly turned leg 32c. The shielded hose construction illustrated in FIG. 14 is particularly well suited for hose formed of a profile strip produced from thin stock material.

Figure 15:
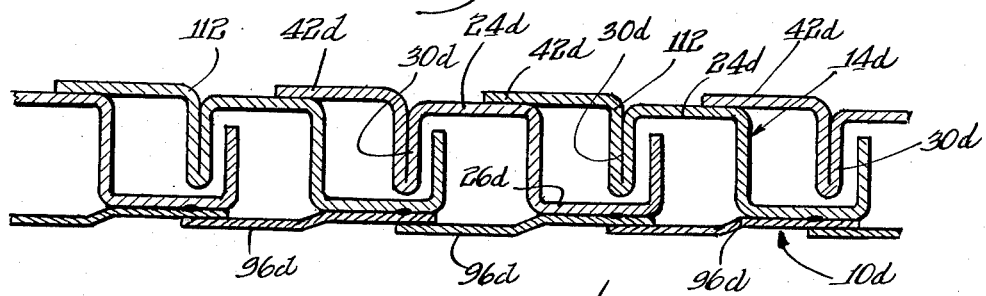
FIG. 15 is a longitudinal sectional view of a wall of still another form of hose.

FIGURE 15 illustrates a modified hose 10d in which components forming counterparts of hoses previously described are identified with the same reference numbers with the use of the suffix "d." The hose 10d shown in FIG. 15 illustrates the manner in which the lining strip 42d can be fashioned from the same sheet of strip material used in forming the profile strip 14d.

As shown, the outboard leg 30d of the outwardly open profile strip channel 24d is folded back on itself and merges with a lining strip 42d at a generally right-angle juncture 112 between the lining strip 42d and the outwardly extending fold of the leg 30d. The lining strip 42d thus formed integrally with the leg 30d on each turn of the profile strip 14d cantilevers laterally into slidable overlapping relation to the inner surface on the outwardly open channel 24d of the adjacent turn of the profile strip, as illustrated in FIG. 15.

It will be appreciated that, in addition to its function of assuring retention of adjacent turns of the helical profile strip in assembled relation to each other, the shield strip forming an integral part on the profile strip of each of the square locked hose structures 10b, 10c and 10d, illustrated in FIGS. 6, 7, 14 and 15, serves to advantage in blocking the entry of materials from the external environment into the interstices between adjacent turns of the profile strip.

FIGURES 9 and 10 illustrate in longitudinal section helically wound hose of "interlocked" construction incorporating novel structural features which provide an assured retention of adjacent turns of the profile strip in assembled relation to each other, while at the same time providing for hose of "interlocked" construction a degree of extensibility exceeding that of hose having a conventional helically wound interlocked construction. Component elements of the hose 10e illustrated in FIGS. 9 and 10 which correspond to components of the hose structure previously described are identified with the same reference numbers with the use of the suffix "e."

As illustrated in FIGS. 9 and 10, the outboard leg 32e of the inwardly open channel 26e of the profile strip 14e is extended and turned through a curve of one hundred eighty degrees to form a hook 116 that extends toward the common leg 28e of the two channels 24e and 26e of the profile strip. The common leg 28e of the two channels 24e and 26e is sometimes referred to in this art as the "center drop" of the profile strip, and may be so referred to in the following description.

The outboard leg 30e of the outwardly open channel 24e is turned through a one hundred eighty degree curve to form a hook 118 which extends toward the center drop 28e, as illustrated.

In the assembled hose, the hook 116 on each turn of the profile strip axially overlaps the hook 118 on the adjacent turn of the profile strip, this axial overlapping relationship of the hooks 116, 118 on adjacent turns of the profile strip being characteristic of helically wound hose known in the art as "interlocked" hose.

In the improved hose 10e, the free marginal edge of the hook 116 is turned radially outward to form on the hook a first abutment or limit stop 120 extending lengthwise along the profile strip. Similarly, the free marginal edge of the hook 118 is turned radially inward to form a second abutment or limit stop 122 extending lengthwise along the profile strip. The two marginal abutments or limit stops 120, 122 are radially dimensioned in relation to other dimensions of the profile strip 14e so that, upon assembly of the hose with the hooks 116, 118 on adjacent turns of the profile strip disposed in axially overlapping relation to each other, as shown, the adjacent abutments or limit stops 120, 122 on adjacent turns of the profile strip are disposed in radially overlapping relation to each other, as shown. Thus, the abutment 120 on each turn of the profile strip in the assembled hose is disposed between the center drop 28e in the profile strip and the abutment 122 on the adjacent turn of the profile strip.

Thus, the limit abutments 120, 122 on adjacent turns of the profile strip 14e have a radially overlapping relation to each other which provides for engagement of the limiting abutments or stops 120, 122 on adjacent turns of the profile strip with each other, as illustrated in FIG. 9, to limit the degree to which adjacent turns of the profile strip can be moved away from each other along the axis of the hose, as an incident to bending of the hose or forced elongation of the hose.

This affords a number of advantages. The mutually interfitting relationship of the limit abutments 120, 122 on adjacent turns of the profile strip provides effective assurance that adjacent turns of the profile strip will not become disengaged from each other. Moreover, this assurance that the hose will remain assembled in use is provided, while at the same time limiting the minimum overlap of the overlapping hooks 116, 118, which include the stops or abutments 120, 122, to a dimension equal to only twice the thickness of the material forming the profile strip 14e. This is of advantage in maximizing the degree of extensibility, and hence the degree of bendability which is achieved in this improved hose which has an "interlocked" construction. It will be appreciated that the maximization of extensibility as achieved in this interlocked hose because of the minimization in the lateral width of each of the hooks 116, 118, which stems from a limitation of the required degree of overlap of the hooks 116, 118 to two thicknesses of the profile strip.

Also, it will be evident, from inspection of FIG. 9, that the two limit abutments 120, 122 on adjacent turns of the profile strip 14e mutually engage each other to terminate movement of adjacent turns of the profile strip toward each other upon contraction of the hose before either of the curved legs 30e, 32e on an individual turn of the profile strip is engaged with the center drop 28e on an adjacent turn of the profile strip. Consequently, the center drop 28e is relieved of having to perform any function as a stop abutment in limiting contraction of the hose. For this reason, the shaping of the center drop 28e of the profile strip need not have great precision. Since neither of the legs 30e, 32e on adjacent turns of the profile strip ever engages the center drop 28e of an individual turn of the profile strip, this center drop need not be capable of serving as a limit stop for limiting contraction of the hose. As a consequence, permissible design limits on the shaping of the profile strip can be relaxed, while at the same time providing an interlocked hose structure of exceptional dependability.

The interlocked hose 10e illustrated in FIGS. 9 and 10 is internally lined by a lining strip 42e welded to the profile strip and is externally clad and shielded by a shield strip 96e welded to the profile strip.

Figure 16:
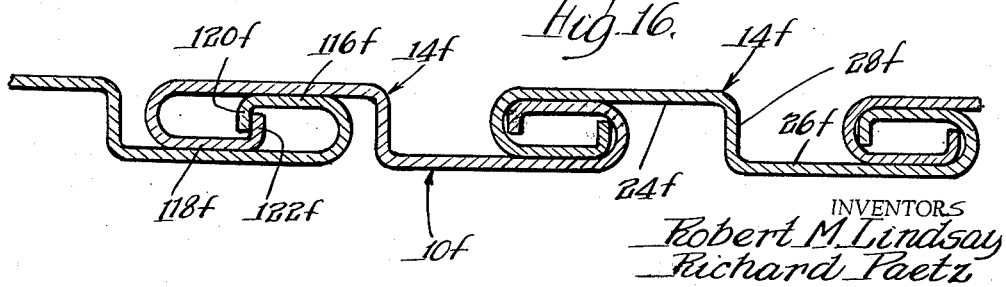
FIG. 16 is a longitudinal sectional view of a simplified form of the hose of FIGS. 9 and 10.

If desired, the interlocked hose 10e illustrated in FIGS. 9 and 10 can be produced without the internal lining strip 42e and the external shield strip 96e shown in FIGS. 9 and 10. Such a simplified interlocked hose is illustrated in FIG. 16, wherein the hose and component elements of the hose are identified with the same reference numbers used in the description of the hose 10e, but with the use of the suffix "f." It will be noted that the hooks 116f and 118f on the simplified hose 10f of FIG. 16 have radially overlapping limit abutments or stops 120f, 122f which provide for the hose 10f advantages corresponding to those previously described in relation to the hose 10e of FIG. 9 and 10.

The internally and externally shielded hose described is well adapted to contain a compressible insulating material. The modified hose 10g illustrated in longitudinal section in FIG. 11 is similar to the hose 10e shown in FIGS. 9 and 10, and differs from the hose 10e essentially by the placement of a compressible insulating material 130, preferably fibrous glass, interstices between the lining strip 42g and the shield strip 96g. Structural components of the hose 10g shown in FIG. 11 which are similar to the hose 10e of FIGS. 9 and 10 are identified with the same reference numbers but with the use of the suffix "g."

Steps in the production of the hose 10e of FIGS. 9 and 10 are illustrated in FIGS. 12 and 13. As shown in FIG. 12, the profile strip 14e is preformed with the hook 118 swung outwardly somewhat from its final position in relation to the central portion of the channel 24e. Similarly, the hook 116 on the preformed profile strip 14e, FIG. 12, is turned outwardly somewhat from the central portion of the channel 26e. As shown in FIG. 12, the lining strip 42e is prewelded to the channel 24e and projects laterally beyond the main body of the profile strip. Also, the shield strip 96e is prewelded to the channel 26e and extends laterally beyond the main portion of the profile strip, as shown.

Winding of the preformed profile strip 14e of FIG. 12 to form the hose 10e is illustrated in FIG. 13, which shows in this longitudinal sectional view the progression of adjacent turns of the profile strip into fully assembled relation to each other. Winding of the preformed profile strip 14e to form the hose 10e, as illustrated in FIG. 13, is performed around a conventional winding arbor, by winding rollers in a conventional winding machine in the manner illustrated, which can be readily carried out by those skilled in the art.

It will be appreciated that the invention is not necessarily limited to use of the particular structure illustrated and described, but includes the use of alternatives and equivalents within the spirit and scope of the invention, as defined by the claims.

The invention is claimed as follows:

1. A helically wound flexible metal hose comprising, a profile strip shaped to define a first channel which opens outwardly and a second channel which opens inwardly, a lining strip extending lengthwise along the length of said profile strip and being integrally joined to said first channel to extend laterally therefrom, a shield strip extending lengthwise along the length of said profile strip and being integrally joined to said second channel to extend laterally therefrom; said integral profile, lining, and shield strips being helically wound so that adjacent turns of the profile strip are mutually locked together to form a flexible hose wall in which said outwardly open first channel of individual turns of the profile strip interfits with said inwardly open second channel of adjacent turns of the profile strip and in which adjacent turns of the profile strip are movable to a limited extent relative to each other, said lining strip projecting laterally from the outwardly open channel of individual turns of the profile strip in the hose wall into slidable overlapping relation to structure on the outwardly open channel of adjacent turns of the profile strip, and said shield strip projecting laterally from the inwardly open channel of individual turns of the profile strip in the hose wall into slidable overlapping relation to structure on the inwardly open channel of adjacent turns of the profile strip 2. A helically wound flexible hose comprising, a profile strip shaped to define an inwardly open first channel and an outwardly open second channel connected together by a common center drop portion of the profile strip, each of said channels having a hook extending axially inward toward said center drop portion of the profile strip, said profile strip being helically wound so that adjacent turns of the profile strip mutually overlap each other to form a flexible hose wall in which said outwardly open second channel of individual turns of the profile strip interfits with said inwardly open first channel of adjacent turns of the profile strip and said hooks on the interfitting first and second channels of adjacent turns of the profile strip mutually overlap axially, the axially overlapping hooks on adjacent turns of the profile strip having marginal edges turned into radially overlapping relation to each other to form radially overlapping limit stops which mutually cooperate to stop relative axial movement of adjacent turns of the profile strip in a hose shortening direction before the center drop portion of the respective turns is engaged by adjacent turns of the profile strip.

3. A helically wound flexible hose comprising, a profile strip shaped to define an inwardly open first channel and an outwardly open second channel, each of said channels having a hook extending with respect to the profile strip laterally toward the center of the strip, said profile strip being helically wound so that adjacent turns of the profile strip mutually overlap each other to form a flexible hose wall in which said outwardly open second channel of individual turns of the profile strip interfits with said inwardly open first channel of adjacent turns of the profile strip and said hooks on the interfitting first and second channels of adjacent turns of the profile strip mutually overlap laterally with respect to the profile strip, and the overlapping hooks on adjacent turns of the profile strip including limit stops which overlap radially with respect to the hose wall to limit relative axial movement of adjacent turns of the profile strip in a hose shortening direction.

4. A helically wound flexible hose comprising, a profile strip defining an inwardly open first channel and an outwardly open second channel joined together by a common central drop portion of the profile strip, said profile strip being helically wound to form a flexible hose wall in which said first channel of individual turns of the profile strip overlaps laterally with respect to the profile strip said second channel of adjacent turns of the profile strip, a locking hook formed on each channel of the profile strip to extend laterally with respect to the profile strip toward the central drop portion of the profile strip, the locking hook on said outwardly open second channel of individual turns of the profile strip being disposed radially outward of and extending laterally into overlapping relation to the locking hook on the inwardly open first channel of adjacent turns of the profile strip, the laterally inner marginal edge of the hook on the inwardly open first channel being turned radially outward with respect to the hose wall to form a first limit stop, the laterally inner marginal edge of the hook on the outwardly open second channel being turned radially inward with respect to the hose wall to form a second limit stop, said first and second stops on adjacent turns of the profile strip extending into radially overlapping relation to each other with said first stop on the individual turns of the profile strip located between the central drop portion of the profile strip and said second stop on adjacent turns of the profile strip, and said first and second stops being positioned laterally to effect by mutual engagement of first and second stops on adjacent turns of the profile strip a positive limitation on relative axial movement of adjacent turns of the profile strip in a hose shortening direction.

5. A helically wound flexible hose comprising, a profile strip defining an inwardly open first channel and an outwardly open second channel connected by a common central drop portion of the profile strip, said profile strip being helically wound to form a flexible hose wall in which the inwardly open first channel of individual turns of the profile strip overlaps and fits into the outwardly open second channel of adjacent turns of the profile strip, the laterally outward side of each channel of individual turns of said profile strip terminating in a generally radial leg which is received within the overlapping channel of adjacent turns of the profile strip so that the hose wall formed by the helically wound profile strip has a square locked construction holding together adjacent turns of the profile strip, a helical liner strip secured to the outwardly open second channel of the profile strip to form an integral part of the profile strip and to extend laterally from the second channel of individual turns of the profile strip into closely adjacent overlapping relation to the second channel of adjacent turns of the profile strip, and a helical shield strip secured to the inwardly open first channel of the profile strip to form an integral part of the profile strip and to project laterally from the first channel of individual turns of the profile strip into closely adjacent overlapping relation to the first channel of adjacent turns of the profile strip.

6. A helically wound flexible metal hose comprising a profile strip shaped in transverse section to define an inwardly open first channel and an outwardly open second channel, said profile strip being helically wound to form a flexible hose wall in which adjacent turns of the profile strip are movably locked together by an overlapping relationship of the inwardly open first channel of individual turns of the profile strip with the outwardly open second channel of adjacent turns of the profile strip, and said profile strip being shaped to form between said first and second channels of the profile strip a fold which extends from individual turns of the profile strip laterally into slidable overlapping relation to the inwardly open first channel of adjacent turns of the profile strip so that said fold forms an exterior shield extending between adjacent turns of the profile strip when the hose is extended.

7. A helically wound flexible hose comprising a profile strip defining an inwardly open first channel and an outwardly open second channel, said profile strip being helically wound to form a flexible hose wall in which said first channel of individual turns of the profile strip overlaps laterally with respect to the profile strip said second channel of adjacent turns of the profile strip, a locking hook formed on each channel of the profile strip to extend laterally with respect to the profile strip toward the middle of the profile strip, the locking hook on said outwardly open second channel of individual turns of the profile strip being disposed radially outward of and extending laterally into overlapping relation to the locking hook on the inwardly open first channel of adjacent turns of the profile strip, the laterally inner marginal edge of the hook on the inwardly open first channel being turned radially outward with respect to the hose wall to form a first limit stop, the laterally inner marginal edge of the hook on the outwardly open second channel being turned radially inward with respect to the hose wall to form a second limit stop, and said first and second stops on adjacent turns of the profile strip extending into radially overlapping relation to each other with respect to the hose wall and being positioned laterally to effect by mutual engagement a positive limitation on relative axial movement of adjacent turns of the profile strip in a hose shortening direction.

8. A helically wound flexible hose comprising, a profile strip defining an inwardly open first channel and an outwardly open second channel, said profile strip being helically wound to form a flexible hose wall in which the inwardly open first channel of individual turns of the profile strip overlaps and fits into the outwardly open second channel of adjacent turns of the profile strip, the laterally outward side of each channel of individual turns of said profile strip terminating in a generally radial leg which is received within the overlapping channel of adjacent turns of the profile strip so that the hose wall formed by the helically wound profile strip has a square locked construction holding together adjacent turns of the profile strip, a helically wound shield strip extending lengthwise along the corresponding length of the helically wound profile strip and having a side surface disposed in close surface engagement with said inwardly open first channel of the profile strip, a fused bond formed between said shield strip and said profile strip and extending along the full length of both strips to integrally unite the two strips to form a single unitary strip; and said shield strip having a longitudinal portion thereof disposed outside of the hose wall formed by the profile strip and projecting laterally from the first channel of individual turns of the profile strip into closely adjacent overlapping relation to the first channel of adjacent turns of the profile strip to form adjacent to said hose wall an external shield extending between and closely overlapping adjacent turns of the profile strip, even when the adjacent turns of the profile strip are fully extended, to prevent disengagement of adjacent turns of the profile strip and at the same time provide for free flexing of the hose and bending of the hose through sharp turns.

9. A helically wound flexible metal hose comprising, a profile strip shaped in transverse section to define an inwardly open first channel and an outwardly open second channel, said profile strip being helically wound to form a flexible hose wall in which the inwardly open first channel of individual turns of the profile strip overlap the outwardly open second channel of adjacent turns of the profile strip, the laterally outward side of each channel of individual turns of the profile strip terminating in a generally radial leg which is received within the overlapping channel of adjacent turns of the profile strip so that the hose wall formed by the profile strip has a squarelocked construction, and said profile strip being shaped to form between said first and second channels of the profile strip a fold which extends from individual turns of the profile strip laterally into slidable overlapping relation to the inwardly open first channel of adjacent turns of the profile strip so that said fold forms an exterior shield extending between adjacent turns of the profile strip when the hose is extended positively to maintain adjacent turns of the profile strip in assembled relation to each other.

References Cited by the Examiner
UNITED STATES PATENTS

| | | | |
|---|---|---|---|
| 916,890 | 3/09 | Rubes | 138—131 |
| 1,145,434 | 7/15 | Pechstein | 138—135 X |
| 1,598,872 | 9/26 | Palmer | 138—135 |
| 1,925,231 | 9/33 | Bundy | 138—122 |
| 2,402,497 | 6/46 | Johnson | 138—135 |
| 2,444,008 | 6/48 | Fentress | 138—122 |
| 3,094,147 | 6/63 | Nemer | 138—154 XR |

LEWIS J. LENNY, *Primary Examiner.*